United States Patent [19]

Andrews et al.

[11] Patent Number: 5,151,306
[45] Date of Patent: Sep. 29, 1992

[54] METHODS OF COATING ELONGATED STRAND MATERIAL

[75] Inventors: Jack E. Andrews, Stone Mountain; Roman J. Harmel, Lilburn; Gregory A. Lochkovic, Lawrenceville; Francis A. Rotoloni, Alpharetta, all of Ga.

[73] Assignee: AT&T Bell Laboratories, Murray Hill, N.J.

[21] Appl. No.: 618,341

[22] Filed: Nov. 26, 1990

[51] Int. Cl.⁵ .............................................. B05D 5/06
[52] U.S. Cl. .............................. 427/434.5; 65/3.11; 118/405; 118/420; 118/DIG. 19; 427/163; 427/434.7
[58] Field of Search ............... 427/163, 169, 434.5, 427/434.6, 434.7, 443.2; 118/405, 420, 428, DIG. 19; 65/3.1, 3.11; 60.5; 264/1.5, 1.6

[56] References Cited

U.S. PATENT DOCUMENTS

| | | | |
|---|---|---|---|
| 2,428,284 | 9/1947 | Krogel | 118/314 |
| 2,428,965 | 10/1947 | Frisco et al. | 118/223 |
| 2,676,565 | 4/1954 | McDermott | 118/325 |
| 2,815,710 | 12/1957 | Pearson | 101/37 |
| 3,021,815 | 2/1962 | Burke et al. | 118/314 |
| 3,392,702 | 7/1968 | Warner | 118/246 |
| 3,434,456 | 3/1969 | Geating | 118/211 |
| 3,594,228 | 7/1971 | Mock | 427/118 |
| 3,733,216 | 5/1973 | Goldman et al. | 427/434.7 |
| 4,366,770 | 1/1983 | Eckstein et al. | 427/434.5 |
| 4,388,093 | 6/1983 | Kimura et al. | 427/163 |
| 4,411,710 | 10/1983 | Mochizuki et al. | 118/DIG. 19 |
| 4,413,585 | 11/1983 | Weinhold et al. | 118/405 |
| 4,505,222 | 3/1985 | Holt et al. | 118/DIG. 19 |
| 4,539,226 | 9/1985 | Paek et al. | 427/434.5 |
| 4,619,842 | 10/1986 | Moss et al. | 427/163 |

FOREIGN PATENT DOCUMENTS 60-131843 7/1985 Japan ................... 427/163

Primary Examiner—Michael Lusignan
Assistant Examiner—Terry J. Owens
Attorney, Agent, or Firm—Edward W. Somers

[57] ABSTRACT

In order to coat successive increments of length of an elongated strand material such as an optical fiber (22), for example, with a marking material, for example, a liquid coating material (40) is circulated through an input section (85) into an inner chamber (71) of a housing (62) and outwardly through an output section (87) to be returned to a reservoir (39). Elongated strand material is advanced through an entry portion into and through the inner chamber wherein it is contacted by the liquid coating material being circulated therethrough. Afterwards, each successive increment of length is advanced through an exit die (73) which causes the liquid coating material to be formed into a layer of predetermined thickness on the elongated strand material.

3 Claims, 2 Drawing Sheets

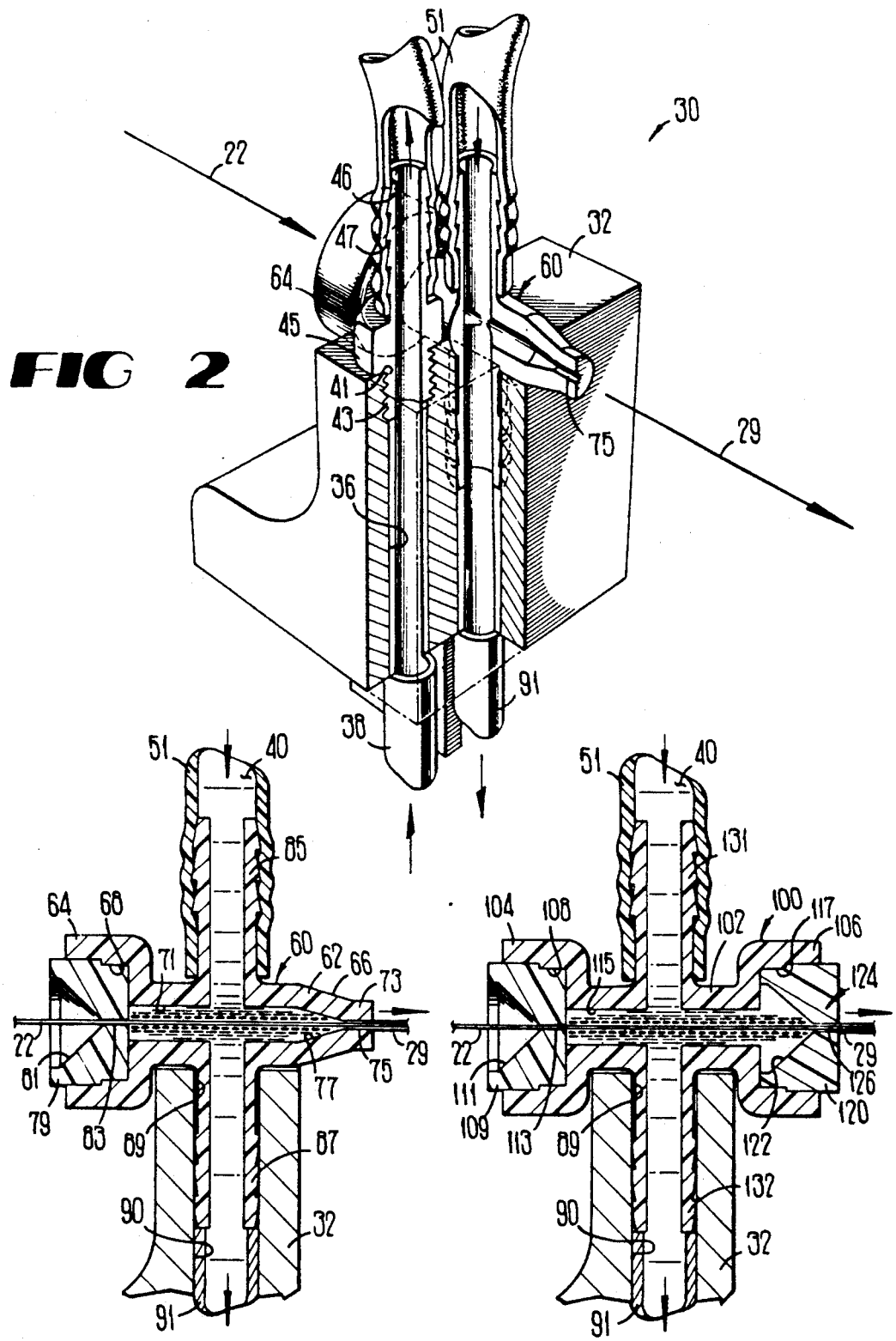

METHODS OF COATING ELONGATED STRAND MATERIAL

TECHNICAL FIELD

This invention relates to methods of coating elongated strand material. More particularly, the invention relates to methods of applying a layer of an identifiable liquid marking material to a moving length of strand material.

BACKGROUND OF THE INVENTION

The use of optical fibers for communications is growing at an unprecedented rate. A typical optical fiber comprises a glass fiber which is drawn from a preform and which has an uncoated diameter of about 125 microns and a coated diameter of about 250 microns.

Subsequently, the drawn optical fiber may be marked for purposes of identification in the field. Identification becomes necessary inasmuch as some cables which are shipped to the field are not preconnectorized in the factory. Also, if cables in the field are damaged such as by inadvertent impact with construction equipment, it becomes necessary to splice optical fibers to replace the damaged portions. Further, as fiber distribution networks expand, midspan entries often are used in order to tap signals at various critical locations, thus emphasizing the need for unit and fiber identification.

Generally, an optical fiber is identified by a marking which is provided on the outer surface of the coated fiber. Typically, the marking is continuous along the length of the fiber; however, additional identifiers are needed as the menu of standard colors is consumed. The marking may comprise inked indicia which are spaced along the length of the optical fiber. Such additional identifiers may include markings which are about 0.25 inch long and spaced apart about 0.25 inch. The ink which is used to mark the fibers typically is a permanent ink possessing viscosities compatible with the application technology at operating temperatures. In wheel type applicators, each inked indicium is applied about only two thirds of the periphery of each optical fiber. This is helpful to the retention of the indicia during particular tests of the marked fiber which are made when the fiber is wrapped about a mandrel, for example.

As can be imagined, the prior art includes arrangements for marking elongated strand material and for marking optical fibers. One such arrangement for elongated strand material is shown in U.S. Pat. No. 3,176,650 which issued to H. L. Woellner on Apr. 6, 1965. In that apparatus, a disc is mounted for rotation about an axis which is angled to the path of travel of an advancing elongated strand material. As the disc turns, a marking medium is flowed radially outwardly to ports to allow the marking medium to be slung into contact with the elongated strand material.

As for optical fibers, it has been customary to advance a fiber across and in engagement with a wick or wheel to which a marking ink is supplied. A cam is used to engage the moving optical fiber and intermittently to disengage the optical fiber from the wick to thereby provide spaced indicia along the fiber for dashing purposes. In addition, methods involving serrated wheel arrangements matched to line speed have been employed. Problems have occurred in the use of such an arrangement. The indicia, typically in the form of dashes, are not uniform and it is difficult to synchronize the movement of the cam with the line speed of the optical fiber.

In another commercially available apparatus, a grease-like ink is pumped upwardly into an application chamber through which an optical fiber is being advanced into engagement with an applicator wheel. It has been found that this arrangement requires a thorough cleaning after it had been used to mark about 1000 meters of fiber. Also, there is no provision for overflow of the ink. Consequently, it is difficult to control the quantity of ink in the application chamber. If there is too much ink, the applicator wheel becomes clogged; if there is too little, it is starved.

Another desired capability of an inking apparatus is that its geometry permits a plurality of such apparatus to be arranged side-by-side to ink a plurality of optical fibers moving in parallel paths prior to the assembly of the fibers into a ribbon or simply for purposes of efficient use of manufacturing space. Many commercially available marking arrangements are too bulky to permit such side-by-side use to mark a plurality of optical fibers which are moving along closely spaced paths.

A technique of marking a plurality of side-by-side elongated strand materials such as optical fibers includes the step of advancing each optical fiber along a path of travel which extends through a chamber. In the chamber is provided a supply member which in a preferred embodiment is porous and resilient and is capable of holding a liquid marking material which is adapted to mark an outer surface of the optical fiber. The liquid marking material is provided to the supply member in a controlled manner. An applicator member having a groove in a portion of its periphery is mounted for movement between the path of travel and engagement with the supply member and such that increments of length of each optical fiber are received in and then removed from the groove. The method also includes the step of moving the applicator member to engage compressively portions of the applicator member with the supply member and cause liquid marking material to be transferred from the supply member to the groove and from the groove to a predetermined peripheral portion of increments of length of each advancing optical fiber.

As the wheel is turned, the grooved portion is moved past and in engagement with a porous, resilient member which is saturated substantially with an ink. The mounting is such that the wheel compresses the porous member as it is moved therepast. This causes ink to fill the groove as the periphery of the wheel is advanced through its engagement with the porous member. Ink is supplied to the porous member through a tube, an end of which is disposed above the porous member. Excess ink falls to the bottom of the chamber where it is allowed to drain from the chamber and be returned to a supply. See U.S. Pat. No. 4,619,842 which issued on Oct. 28, 1986 in the names of P. A. Moss and F. A. Rotoloni.

The geometry of this last-described arrangement is such that a plurality of the applicator wheels can be placed side-by-side to mark simultaneously a plurality of advancing optical fibers which are spaced apart slightly. In one embodiment, the paths of the side-by-side fibers through apparatus are spaced apart about one-half of an inch.

One of the problems associated with the last-described apparatus is wear. It has been found that the portions of the apparatus which transfer the marking material to the optical fiber are subject to wear and or damage. Accordingly, the apparatus must be inspected periodically and replaced or maintained as is necessary.

Another problem relates to cleanliness of presently used marking apparatus. For example, the ink may be picked up by marking discs in an open container and transferred to the moving fiber. With the openess of the container and exposure of marking wheels to the ambient environment, the marking ink could become invaded by contaminants which could be transferred to the optical fiber. Additionally, in a system which involves an open chamber, ink viscosities may readily vary, and subsequently alter run conditions even during the length of a single optical fiber.

Clearly, what is needed and what does not seem to be available in the prior art are methods and apparatus for coating strand material in a way in which problems of wear and contamination are overcome. Such methods and apparatus must be relatively inexpensive to implement in order not to add unintentional cost to the product. More particularly, there is a need for methods and apparatus for marking optical fibers in a uniform manner to facilitate field identification. The sought-after apparatus should be one which can be placed side-by-side with other identical apparatus to mark a plurality of optical fibers being advanced side-by-side in closely spaced relation to one another.

SUMMARY OF THE INVENTION

The foregoing problems of the prior art have been overcome with the methods of this invention. In a method of coating an elongated strand material, a housing which includes an entrance, an exit die opening each of which communicate with an inner chamber and two aligned passageways, each of which opens to the inner chamber, is provided. An elongated strand material is moved to advance successive increments of length of the strand material through the entrance, through the inner chamber and through the exit die opening, while a coating material is circulated through one of the passageways into the inner chamber into contact with the successive increments of length of strand material being advanced through the inner chamber and out through the aligned other passageway, thus providing a flushing of the housing during processing.

In apparatus for coating an elongated strand material, there is provided a supply of a length of elongated strand material, and facilities for moving successive increments of length of the elongated strand material along a path of travel. A housing is disposed along the path of travel and includes an entrance portion, an exit die and an inner chamber which communicates with the entrance portion and the exit die. The housing also includes aligned input and output portions, each of which communicates with the inner chamber. Also included are facilities connected to a supply of a coating material such as a liquid marking material and to the input portion for circulating a coating material through the chamber of the housing to contact successive increments of length of the elongated strand material which are advanced therethrough. The circulation facilities also are connected to the output portion to return unused coating material after it has flowed through the inner chamber to the supply. Also, the apparatus includes facilities for taking up successive increments of length of the elongated strand material which have been coated.

BRIEF DESCRIPTION OF THE DRAWING

Other features of the present invention will be more readily understood from the following detailed description of specific embodiments thereof when read in conjunction with the accompanying drawings, in which:

FIG. 2 is an enlarged perspective view which includes one of the devices of FIG. 1 that is used to apply a coating material to a moving optical fiber;

FIG. 3 is an elevational view in section of the device of FIG. 2; and

FIG. 4 is an alternative embodiment of a device which may be used to apply a coating material to a moving optical fiber.

DETAILED DESCRIPTION

Figure 1:
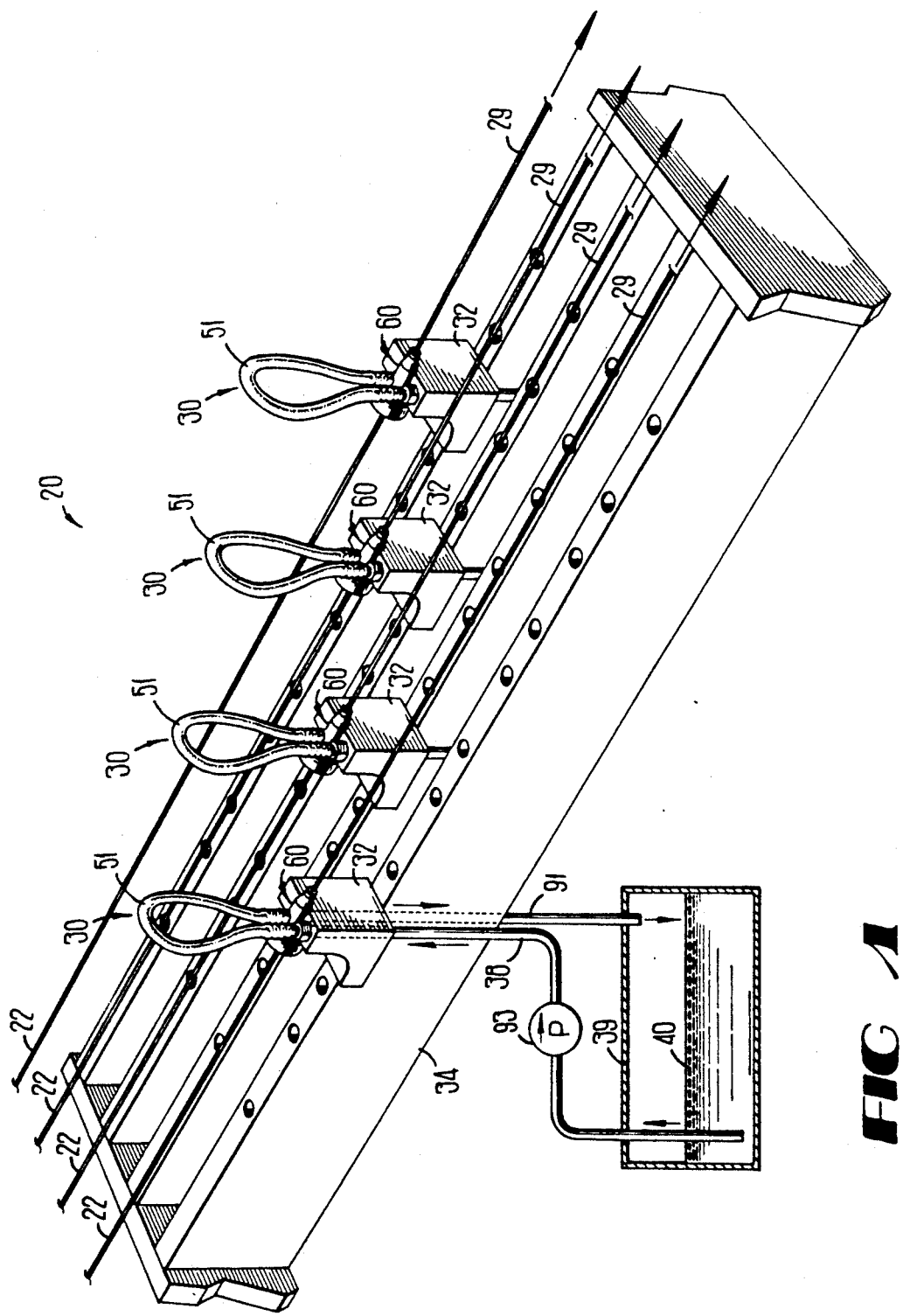
FIG. 1 is a view which is partially in perspective and which depicts apparatus including a plurality of devices for applying a coating material such as a liquid marking material to a plurality of optical fibers being moved along paths of travel.

Referring now to FIG. 1, there is shown a schematic view of apparatus which is designated generally by the numeral 20 and which includes facilities for applying a coating material such as a liquid marking material, for example, to successive increments of length of each of a plurality of elongated strand materials such as, for example, a plurality of optical fibers 22—22. Each optical fiber 22 is payed off from a supply (not shown), moved through portions of the apparatus 20 by facilities not shown and taken up on an appropriate package.

The optical fiber 22 is one which has been drawn from a preform and coated with one or more layers of protective materials to provide an outer diameter of about 250 microns. The apparatus 20 is effective to apply a liquid marking material to each optical fiber 22 to provide a marked optical fiber 29 having a continuous indicium formed by the liquid marking material. It should be understood that although this description is directed to the application of a liquid marking material to each of a plurality of moving optical fibers, the apparatus could just as well include facilities for applying a liquid marking material to a single optical fiber or other strand material having a substantially circular cross section transverse to a longitudinal axis of the strand material and being moved from a supply to a takeup.

Viewing again FIG. 1 and also FIGS. 2 and 3, there is shown an apparatus designated generally by the numeral 30 for applying a liquid marking material to a moving optical fiber. The apparatus 30 includes a base 32 which is supported in a container 34. The base 32 includes a passageway 36 having an entry end which is connected to an input conduit 38. The input conduit is connected to a reservoir 39 of a liquid marking material 40 such as a supply of ink, for example.

Connected to an exit orifice of the passageway 36 is a coupling 41 which has a threaded end portion 43 adapted to be turned threadably into an exit orifice of the passageway 36. The end portion 43 extends from one side of a center portion 45.

A tubular portion 46 extends from an opposite side of the center portion 45 and is constructed to include a plurality of externally facing barbs 47-47. The barbs 47-47 are helpful in securing to the exit coupling a length of flexible tubing 51. The barbs 47-47 tend to become embedded in an inner wall of an end portion of the tubing 51 which is caused to become disposed over the tubular portion 46. The length of flexible tubing 51 is effective to connect the base 32 to a device 60 which also is supported in the base 32 and which is used to cause the liquid marking material to be applied to each successive increment of an optical fiber.

Referring again to FIG. 2 and particularly to FIG. 3, it can be seen that the device 60 of the preferred embodiment includes a housing 62 having an entrance portion 64 and an exit portion 66. The entrance portion 64 is formed to provide a cavity 68 which opens to a chamber 71 which extends toward the exit portion 66. The exit portion 66 includes a die 73 having a land 75 which defines the die opening and communicating with the chamber 71 through a tapered portion 77 designed to allow ease of string-up of optical fiber at the beginning of a run. Received within the cavity 68 of the entrance portion 64 is an insert 79 having a connically shaped well 81 which communicates with a bore 83. The bore 83 opens to the chamber 71 of the housing 62 and is aligned with the die 73.

The bore 83 is sized to permit passage therethrough of a strand material such as a priorly coated optical fiber whereas the die 73 is sized to permit passage therethrough of a strand material to which the liquid marking material 40 has been applied. Typically, the priorly coated optical fiber 22 has an outer diameter of about 9.6 to 10 mils; however, other strand diameters are easily accommodated by varying the entrance and exit diameters of the bore 83 and of the die 73 in conjunction with the length of the land 75. In the preferred embodiment, the bore 83 has a diameter sufficient to provide the capability for centering the strand material being advanced through the die 73.

It is important that the bore 83 and the opening of the die 73 be aligned accurately. Also, it is important that the housing 62 be manufactured such that any angle between the longitudinal axis of the opening defined by the land 75 and a longitudinal axis through the entrance portion 64 not exceed about 1.5 degrees. Otherwise, the optical fiber with the marking material applied thereto may engage the wall of the die opening thereby causing marking material to be removed therefrom.

Centered movement of the optical fiber through the die 73 relies partially on hydrodynamic centering. The tension on the strand material being advanced through each device 60 should be relatively low to optimize the hydrodynamics of the liquid marking material which fills the chamber 71, tending to center the moving strand material within the die opening.

Returning to FIGS. 2 and 3, it can be seen that the housing 62 also includes a barbed input section 85 and a barbed output section 87 each having an outer configuration similar to that of the portion 46. As such, the section 85 has a plurality of barbs formed therealong to facilitate the securement of tubing thereto. More particularly, in this instance, an end portion of the flexible tubing 51 is connected to the input section 85.

Viewing now FIG. 2, it can be seen that the base 32 includes an opening 89 which is connected through an internal passageway 90 to a conduit 91 which is connected to the return side of the reservoir 39. The output section 87 of the device 60 is adapted to be received in the opening 89 and the passageway 90 when properly sized for a light press fit. Because of its barbed outer configuration, the output section 87 becomes embedded in the wall of the base 32 which forms the opening 89 and the passageway 90 when properly sized for the press fit.

The device 60 is used to cause the liquid marking material to be applied to moving optical fiber. Successive increments of length of optical fiber are advanced into the well 81 of the insert 79, through the bore 83, into and through the chamber 71 and out through the die 73. As each successive increment of length of the optical fiber traverses the chamber 71, it becomes exposed to the liquid marking material. Liquid marking material is circulated by a pump 93 from the reservoir 39 through the conduit 38, through the base 32 and the flexible tubing 51. From the flexible tubing 51, the liquid marking material is flowed into the input section 85 of the device 60, through the chamber 71 and outwardly through the output section 87. Unused liquid marking material is returned to the reservoir by way of the conduit 91.

The methods and apparatus of this invention provide several important advantages over the prior art. First, the device 60 preferably is made of a molded plastic material for cost effectiveness and is disposable. By disposable is meant that after each run of a supply of elongated strand material to be coated, such as, for example, a length of optical fiber, the device 60 is replaced. Inasmuch as the cost of each device 60 is relatively low, the benefits of periodic replacement far outweigh the costs.

The benefits of periodic replacement are significant. Optical fiber being moved through the device 60 tends to draw in foreign matter which could be deleterious to fiber strength and microbending loss. Because of the circulation of the liquid marking material through the chamber 71, a flushing action occurs thereby cleansing internal portions of the device 60. It should be noted that an in-line filter may be employed at the input or output sections of the device 60, or both, to enhance the cleansing. The result is a smoother, cleaner surface on the optical fiber. Still further, the flushing action is effective to maintain the cleanliness of the exit die 73. There is no buildup of particles inside the device 60 which could be transferred to the moving optical fiber and clog the die 73 as the optical fiber is moved therethrough.

Still further, by using a disposable applicator, periodic cleaning of the applicator is unnecessary. Replacement of a device 60 requires only a relatively short time. Also, inspection for wear of dies is no longer necessary. In addition, the liquid marking material which is applied is cleaner because each device 60 is included in is a closed system. Because the system is closed, any loss of ink or viscosity variation through evaporation is eliminated.

Depicted in FIG. 4 is an alternate embodiment of a device for applying a liquid marking material to the moving optical fiber. A device 100 includes a housing 102 having an entrance portion 104 and an exit portion 106. The entrance portion 104 is formed with a cavity 108 in which is received an insert 109. The insert 109 includes a conically shaped well 111 which communicates with a bore 113. As is seen in FIG. 4, the bore 113 communicates with a chamber 115.

The exit portion 106 of the device 100 includes a cavity 117 in which is received a die insert 120. The die insert 120 includes conically shaped entrance 122 which communicates with the chamber 115 and with a die 124 defined by a land 126.

Also, the device 100 includes a barbed, liquid marking material input section 131 and a barbed, liquid marking material output section 132. As is seen in FIG. 4, the input section 131 is connected to the tubing 51 whereas the output section is connected to the conduit 91. In order to increase pressure within the die 73 and filling of the chamber 71, the input and output sections 131 and 132, respectively, may be offset from each other.

It is to be understood that the above-described arrangements are simply illustrative of the invention. Other arrangements may be devised by those skilled in the art which will embody the principles of the invention and fall within the spirit and scope thereof.

We claim:

1. A method of coating elongated strand material, said method comprising the steps of providing a housing which includes an entrance and an exit die each of which communicates with a chamber, and two aligned passageways, each of which opens to the chamber; and moving an elongated strand material to advance successive increments of length of the strand material through the entrance, through the chamber and transversely past the aligned passageways and through the die; while circulating a coating material through one of the passageways into the chamber into contact with the successive increments of length of strand material being advanced through the chamber and out through the aligned other passageway, the circulation of the coating material being effective to provide a flushing of the housing.

2. The method of claim 1, wherein successive lengths of elongated strand material are coated by said method and wherein said method includes the step of replacing the housing with an unused housing after each length of elongated strand material has been coated.

3. The method of claim 1, wherein tension on elongated strand material being advanced through the chamber is sufficiently low that the tension cooperates with the coating material which is circulated into and out of the chamber to center the elongated strand material along a longitudinal centerline axis which extends through the entrance and exit die as the elongated strand material is moved therethrough.

* * * * *